United States Patent
Taylor et al.

(10) Patent No.: US 7,395,552 B2
(45) Date of Patent: Jul. 1, 2008

(54) TEAM BASED ROW LEVEL SECURITY SYSTEM AND METHOD

(75) Inventors: Jacob Taylor, San Jose, CA (US);
Clinton Oram, San Jose, CA (US);
Johri Roberts, San Jose, CA (US)

(73) Assignee: SugarCRM, Inc., Cupertino, CA (US)

( * ) Notice: Subject to any disclaimer, the term of this patent is extended or adjusted under 35 U.S.C. 154(b) by 0 days.

(21) Appl. No.: 11/255,674

(22) Filed: Oct. 20, 2005

(65) Prior Publication Data

US 2006/0200860 A1    Sep. 7, 2006

Related U.S. Application Data

(60) Provisional application No. 60/621,360, filed on Oct. 22, 2004.

(51) Int. Cl.
*H04L 9/00* (2006.01)
(52) U.S. Cl. .............................. 726/28; 726/29; 705/51; 705/52
(58) Field of Classification Search .................. 705/51, 705/52; 726/28, 29
See application file for complete search history.

(56) References Cited

U.S. PATENT DOCUMENTS

| | | | | |
|---|---|---|---|---|
| 5,941,947 | A | * | 8/1999 | Brown et al. ................. 709/225 |
| 6,820,082 | B1 | | 11/2004 | Cook et al. ..................... 707/9 |
| 2005/0033726 | A1 | | 2/2005 | Wu et al. ........................ 707/1 |
| 2005/0262087 | A1 | | 11/2005 | Wu et al. ........................ 707/9 |

* cited by examiner

*Primary Examiner*—Emmanuel L Moise
*Assistant Examiner*—Paul Callahan
(74) *Attorney, Agent, or Firm*—DLA Piper US LLP (57) ABSTRACT

A team based row level security system and method are provided that permits items of data to be shared across a team.

27 Claims, 10 Drawing Sheets

STEP0: SET THE USER TO THE INITIAL FOCUS

STEP1: ADD THE CURRENT FOCUS TO THE VISITED LIST

STEP2: SET EXPLICIT TO FALSE

STEP3: IF THE FOCUS HAS IMPLICIT ACCESS
 STOP

STEP4: IF THE FOCUS DOES NOT HAVE A REPORTS TO
 STOP.

STEP5: SWITCH FOCUS TO THE REPORTS TO OF THE CURRENT FOCUS

STEP6: IF THE FOCUS IS ON THE VISITED LIST
 STOP.

STEP7: PUT THE FOCUS ON THE VISITED LIST

STEP8: IF ANY OF THE FOCUSES DIRECT REPORTS HAS IMPLICIT SET
 STOP

STEP9: SET IMPLICIT TO FALSE FOR THE FOCUS AND GOTO STEP 4.

FIG. 5

STEP0: SET THE USER TO THE INITIAL FOCUS

STEP1: FOR EACH TEAM THAT THE FOCUS IS A MEMBER OF:
 A. RUN THE ITERATIVE REBUILD FOR MEMBER REMOVAL STEPS.
 B. ADD THE TEAM TO THE LIST OF THE USER'S TEAMS.

STEP2: UPDATE THE MANAGER OF THE FOCUS

STEP3: FOR THE LIST OF USERS' TEAMS CREATED IN STEP 1B:
 A. RUN THE ITERATIVE REBUILD FOR MEMBER ADDITION STEPS.

```
CREATE TABLE 'teams' (
'id' varchar(36) NOT NULL default'',
'name' varchar(128) default NULL,
'date_entered' datetime NOT NULL default '0000-0000 00:00:00',
'date_modified' datetime NOT NULL default '0000-00-00 00:00:00',
'modified_user_id' varchar(36) NOT NULL default'',
'description' text,
'deleted' tinyint(1) NOT NULL default '0',
PRIMARY KEY ('id')
KEY 'idx_team_del' ('name'(30))
) TYPE=MyISAM;
CREATE TABLE 'team_memberships' (
  'id' char(36) NOT NULL default'',
  'team_id' char(36) NOT NULL default'',
  'user_id' char(36) NOT NULL default'',
  'explicit_assign' tinyint(1) NOT NULL default '0',
  'implicit_assign' tinyint(1) NOT NULL default '0',
  'deleted' tinyint(1) NOT NULL default '0',
  PRIMARY KEY ('id'),
  KEY 'idx_team_membership' (team_id', 'user_id')
) TYPE=MyISAM;
```

FIG. 14

TEAM BASED ROW LEVEL SECURITY SYSTEM AND METHOD

PRIORITY CLAIM/RELATED APPLICATION

This application is a continuation in part of and claims priority under 35 USC 19(e) to U.S. Provisional Patent Application Ser. No. 60/621,360 filed on Oct. 22, 2004 and entitled "Team Based Row Level Security System and Method" which is incorporated herein by reference.

FIELD OF THE INVENTION

The invention relates generally to a security system for a computer software application and in particular to a system and method for providing security for a computer-based database software application system.

BACKGROUND OF THE INVENTION

There are several different approaches that have been tried in the past to solve the problems of data security. The simplest method for data security that provides some measure of protection is to only lock down the system itself. If a user can login to the system, then they have full access to all of the records stored on the system. For smaller companies, this method of securing data can be sufficient. Managers can typically see into their direct reports data. As soon as the company grows to the point of specialization among team members or competition among members of the sales force, this method of securing data is no longer enough.

The next evolution in data security is known as personal lists. There is typically one list per user and potentially one global list. If a user would like to grant access to someone to work with them on one of his/her records, the user needs to grant access to the entire list of records of the user. This method works well for simple situations where the user would like to have an assistant work with the records but not other users and individuals. However, this technique does not work well for complicated teams and/or overlapping teams. Like the previous method, it also does not secure any data from people that are granted some access to records.

Another solution to the problem is to have security lists that are created on a per item basis. Thus, the list on each item will tell the user who has access to the item. While this mechanism allows for good security and good sharing of items, it is typically very expensive to implement and maintain. For example, users have to worry about who has access to the data and will have to make changes to specific items one at a time. Furthermore, system-wide team changes can be very expensive. In addition, the changing of an item's ownership from one team to another is a very expensive operation that requires removing all existing team members and adding new ones. The data structures to maintain all of these teams and records and lists for the many teams and maintaining the consistency of the lists are also expensive from both the database and algorithm perspective. While this method provides a very granular level of security control that is very present in the user's mind, it takes a lot of manual work to maintain in typical installations, and is expensive to maintain and implement in the database layer.

Another simple security mechanism is to protect access to data based on roles. Users with a certain role can see and/or modify certain types of data. For instance, users with the sales role have the ability to see and edit all sales deals while users with the sales audit role can see all deals, but not edit them. This is a relatively crude security mechanism in that it does not easily provide granular access to data. Thus, it is desirable to provide a new more effective and efficient row level security algorithm, and it is to this end that the present invention is directed.

SUMMARY OF THE INVENTION

In accordance with the invention, a row level security mechanism is provided that solves many of the common problems in prior solutions and has many features and advantages over the conventional systems. The system offers maximum flexibility in a simple system that is easy to understand and offers high performance. The invention allows for the creation, management, administration, and enforcement of team based security. In the system, all secured items are owned by one team and only users that are on the team that owns the item or the people that they report to are allowed to see that item. The selection of users for each team is completely flexible and the maximum and minimum team size is flexible. Furthermore, users can be a part of an unlimited number of teams. This flexibility allows for teams to be created that match the working structure of the organization. People that typically work together on a project can have an extra team that allows them to share items. Teams are not locked into geographies or reporting structure. Because the teams are designed to be based on the actual working patterns of users and are easy to adapt as those working patterns change, the teams are highly reusable so that a user does not need to create an ad-hoc team for each item that is in the system. The system may also have a common pool of teams that can be reused for multiple items. Furthermore, while the system does not force a user to create a team per item, there is no restriction on doing so.

In accordance with the invention, items are owned by teams and the ownership is signified by a team_id column in the item that is being owned. The team_id column maps to a specific team, and can be used to determine all of the memberships for that team. When new items are added, the only thing that is needed to set access to the appropriate group of people is to set the team_id to match an existing team. As a result, the number of teams is not proportional to the number of items in the system which results in a massive space and management savings.

DETAILED DESCRIPTION OF A PREFERRED EMBODIMENT

The invention is particularly applicable to multi-user team-based applications in a group environment. It is in this context that the invention will be described. It will be appreciated, however, that the algorithms, data structures, and implementation in accordance with the invention has greater utility, such as to be used for record locking for records that are not stored in the system or to provide more granular control over records instead of all or nothing access. For purposes of illustration (and merely as an example of the implementation of the security system in accordance with the invention,), the described system is an implementation in a customer relationship management (CRM) and groupware system although the inventive methods apply across multiple systems. In the example, the CRM and groupware system is SugarCRM Inc.'s Sugar Sales Professional 2.0. It is a database driven application that demands quick response time. Since it is used as a sales force automation application data security is a must. Furthermore, sales people need to be able to share data with their extended team that includes sales engineers, management, legal representation, auditors. They also need the ability to keep their information private from peers in their organization. The invention is very effective at meeting this need. Also, since the UI response time should be sub-second, the nature of the implementation of the team memberships allows for very fast calculations as to what should be visible to a user.

Another business need of sales users is to be able to create ad hoc teams for cooperative work without sharing all data. The invention allows for users to keep their private team to themselves and have additional teams that select individuals can see. In addition, sales managers need to be able to see graphs of all data in the system for all of the people that are in their organization below them. The invention creates a list of all teams that the manager should be able to see when team members are added and maintains the list when team memberships are removed. The calculations are done when team memberships are changed only. This allows for very fast retrieval of data for graphing, viewing, and exporting even when the organizational chart is huge. The invention makes it very easy to answer if a given user should have access to a given piece of data.

The invention is also easy to use in a system. There are only a few key things in an existing system that need to be trapped and modified in order to implement the security system in accordance with the invention. For example, when a user or removed from a team or the system, the team memberships need to be updated to compensate. Private teams need to be created and deleted as appropriate. When items or lists are retrieved (for display, export, external viewing, reporting, . . . ), unless the user is an administrator or the object has a flag set to ignore security, the items or list should add the security check. The way this is implemented in the current embodiment is by using a base class and a data retrieval API. The base class has methods for building list queries, saving, and retrieving individual items. Each specific type of data creates a subclass of this base class. In a preferred embodiment of the invention, the base class is called SugarBean. There is at least one subclass of SugarBean for each module. SugarBeans are used for creating database tables, cleaning out database tables, loading records, loading lists, saving records, and maintaining relationships. One example of a SugarBean subclass is Contact. Contact is a simple object that fills in some member variables on the SugarBean and leverages SugarBean for much of its logic. Security for instance, is automatically created for Contact. Another example of a SugarBean subclass is Users which is a module that is security related and should not have row level security applied to them. For this reason these modules have the bypass flag set to skip adding the right join for verifying security.

Another portion of the integration of the invention and the application is the administrative screens for the teams and team memberships. Teams and team memberships are both subclasses of SugarBean. They use standard SugarBean based UIs for listing teams, editing teams, creating new teams, duplicating teams, saving teams, adding members to teams, removing members from teams, etc.

The SugarCRM Sugar Sales system is a web based system with many concurrent users. Since this program contains critical data to the users, it is imperative that they have quick access to the system and their data. The most frequent activity in an SFA application is to look at existing data. The invention does a great job at making that frequent process really inexpensive. The algorithms for iterative cleanup will help keep maintenance cost down in large systems.

Since teams and team memberships are maintained outside of the items, changing team ownership of an item is a really inexpensive (computationally and user time) process. The team_id column is changed, and the entire security mechanism for that item is instantly changed. In accordance with the invention, there is no need to make any modifications to other tables or to copy existing teams. This makes it very quick and efficient to move item ownership between teams. The low impact and quick implementation of moving items between teams makes it quite feasible to allow for mass moving of items between teams. In accordance with the invention, a user can get a list view of items and can pick items that they would like to move to another team, pick the team they would like to change ownership of the items to, and then hit mass update which will result in all selected items being moved to the new team. This update/move process is a very simple query and is very fast.

The invention offers a simple consistent mental model to the end user since every item is owned by a team if you are on the team and you have access to the item. This model produces expected behavior while people are interacting with items. It is easy to explain and quick to grasp. Management can request changes to teams and they are easy to implement system wide and avoid human error levels present in updating and maintaining current item-based teams.

When a person is added to a team, all of the people that they report to up the organizational chart of the company immediately gain access to all items owned by the team. This allows for management and upper management to view the items that people working in their organization are working on. The mechanism is automatic and tracks the management structure of the company as implemented in a product.

The invention is used in the product in many places. All of the locations that access primary items go through a common base class. This common base class ensures that the team ownership and user permissions are respected. The team membership structure is used to restrict which items a user can see in a list, in a list of related items, the details of, edit, save, delete, export, include in reports, and include in graphs among other things.

The invention preferably has more than one level of team membership including explicit team membership and implicit team membership. Explicit team membership is when the user was specifically added to the team which could be because the team was created for this user, the user joined a workgroup, the user switched groups, the user requires additional visibility into the corporate data etc. Implicit team memberships are ones that are implied by the management hierarchy. The invention creates an explicit team membership when users are added to the team. At that time, the system will also create implicit team memberships for all of the people to which the new user reports in the management hierarchy. All modifications to the reporting structure and users trigger the appropriate updates in implicit memberships. The invention tracks both implicit and explicit memberships to speed up the process of adjusting team memberships to be consistent with organizational changes. For instance, if a user was added to a team explicitly and the user had a direct report that was on that team, the user's membership on that team would be both implicit and explicit. If the user were to be removed from the team, then the system would still know that the user should have implicit access (assuming that the direct report still exists) and the only required step is to remove the explicit access of the user. The fact that both types of team memberships have the same columns allows for quick verification of team membership. Also many other systems require walking the management hierarchy of searching for a list of teams when validating security. The invention only looks to see if the current user has a membership in this team. This greatly speeds up the time required to ensure that full and appropriate access is available. Due to the straight forward nature of verifying if a request should be authorized to view an item, we added a hook that will add the security check to the SQL query used to retrieve the list or the item.

All user and item changes that are relevant are trapped in the system and call helper methods on the row level security. When a new user is created, the system creates a new team for them and gives them (and the people above them in the organization chart) access to items owned by the team. This team gives individuals a place to put personal items or items that should not be visible to their peers, but may be viewed by their supervisors and other people in the management chain above the user.

Another common need for secure systems is to allow for some items to be globally accessible. The invention creates a global team initially and all items from previous systems are automatically placed in the global team. The global team is a team where every user has explicit access. When users are added or removed from the system, their global team memberships are created and deleted, respectively. This provides a consistent mechanism for securing data that does not require an extra column in the item tables or a more complicated query to handle the special case of global data. The implementation of the global team also provides a quick and easy way for small shops to disable the team based security. If they do not want team based security, they do not create any additional teams. The default team for all users would then be the global team and all items would be either in the user's private team or globally available.

Another common issue with many implementations is that they combine the concept of user assignment and team ownership. The invention keeps the two separate. This allows for the ownership transitions to not have any unplanned effects on the team that can view and work with the item. Keeping the two concepts separate also makes it much easier for users to understand the effect of each change they make.

Users have the ability to see the list of teams that they belong to. This can be used to determine when they should or should not have access to an item that a coworker would like them to be able to see. Users that are not administrators do not have the ability to edit team membership or create and remove teams.

Figure 1:
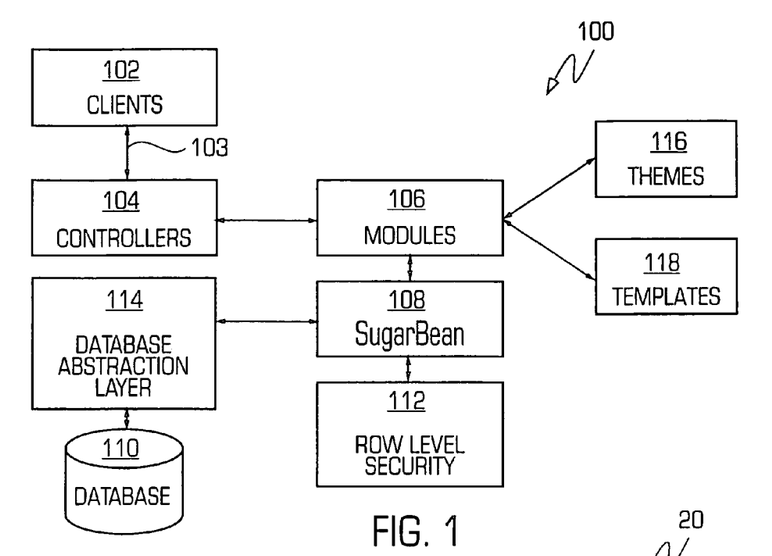
FIG. 1 is a diagram illustrating a customer relationship management system that incorporates the security system.

The team membership management user interface may be part of the system shown in FIG. 1 and may preferably be implemented using the typical user interface paradigms of the product. In particular, the teams have details that include the name of the team and the description of the team. From the team screen, you can add additional members. There is a detail screen for teams that shows all of the team attributes and an edit view for the team that allows you to change the value of the attributes. From the detail view of a team, you can add and remove members.

Although the current implementation of the security system provides all or nothing access to an item, the invention is sufficiently general to handle multiple levels of access. For instance, restricting items to allow for viewing them in lists but not the full details, viewing the details but not editing, editing but not deleting or exporting, . . . can all be added with the addition of a simple property on team_membership table and minor additions to logic in the queries. The current implementation is used to secure the data structures for the system shown in FIG. 1, but it is a general process that can be used in any context to provide restrictions similar to what is described herein. Furthermore, due to the design of the process, there are no requirements that the items being secured are items that are stored in the system database shown in FIG. 1. The system may also allow for temporary team memberships. For instance, if a salesperson is helping out another sales team, they could be added for fixed period of time to the new team. This team membership would be automatically revoked once the time period expired. Entire teams can also be created on a temporary basis. They can either be setup to expire on a timed basis, or they can be manually created and deleted.

The system may also have the ability to detect if there is a problem with the data structures. Several basic checks should be run to determine if there is a problem. If there is a problem, then one of the rebuild processes described below should be triggered. The checks are not limited to but include: 1) verifying that there are no team membership database entries where the values for implicit and explicit are both false; 2) verifying that there is at most one team membership entry in the database per team/user pair; 3) checking for cycles in the user reporting hierarchy; and 4) checking for implicit memberships that are not set in the database. Now, the team based security system in accordance with the invention will be described in more detail.

FIG. 1 is a diagram illustrating a customer relationship management (CRM) system 100 in accordance with the invention. In a preferred embodiment, the system 100 in accordance with the invention is implemented as a software system that may preferable use open source code. In the preferred embodiment, the elements shown in FIG. 1 are thus implemented as a plurality of lines of computer code that may be executed by a processor of a computer system, such as a server computer with typical components, wherein the various lines of computer code are stored in a memory associated with the computer system and the system interfaces with a database 110. The system may have one or more clients 102, such as a browser application executed on a typical computing device (a browser client session), that accesses the system over a computer network 103 such as the Internet. The client 102 interactions go through a set of one or more controllers 104. The controllers are the entry-point into the system and take care of things like session tracking and session security and end user authentication. The controllers also take care of the work to prepare the screen or the wrapper for the content and determine which module of the application the user is trying to access and get the requested module to process the request. The system thus has one or more modules 106 that are components of application functionality and provide certain functionality. The modules 106 of the CRM system may include, by way of example, a portal module, a calendar module, an activities module, a contacts module, an accounts module, a leads module, an opportunities module, a quotes module, a products module, a cases module, a bug tracker module, a documents module, an emails module, a campaigns module, a project module, an RSS module, a forecasts module, a reports module and a dashboard module. Each of these modules provides a different functionality to the system so that, for example, the calendar module provides a calendaring functionality to the CRM system that is instantiated with the system. The system may also include an administration module that handles the typical administrative functions of the system. Each module contains a subclass of a SugarBean base object 108 and each module references the SugarBean to retrieve the data from the database 110 required for display.

The system also includes the database 110 that contains the data of the system and a security module 112 that implements the security methods to control access to the data in the database 110. The system may also include a database abstraction layer 114 that is coupled between the database 110 and the Sugarbean object 108 in order to by an interface between the database 110 and the Sugarbean object 108. The SugarBean object 108 provides the base logic required for retrieving and making available information from the database and each module creates subclasses of SugarBean to provide module specific details. During the process of retrieving data from the database, the SugarBean 108 makes calls that populate the row level security information into the SQL that retrieves the data.

Once the data is retrieved from the SugarBean object 108, the module uses a template mechanism 118 and a theme 116 to produce the requested presentation for the user. The template mechanism reformats the data from the database 110 into a particular form while the theme adjusts the user interface according to the user's preferences. If, for instance, the user requests an HTML presentation of the detail view of the contact module for a specified contact, here is the flow of what happens. The user hits the controller named index.php. It handles most of the logic for the main application. The index controller loads the current user, verifies authentication and session information, loads the language for the user and produces some of the UI shell. It then calls the contact module and request the detail view for the specified contact. The contact module retrieves the SugarBean for the requested contact. The SugarBean verifies row level security at this point. If the record is not retrieved successfully, then the process aborts and the user is not allowed to view the data for the record. If the retrieve succeeds then it uses the XTemplate mechanism and the code for the current user's theme to create the UI for presentation. The resulting UI is sent back to the client that requested it.

Figure 2:
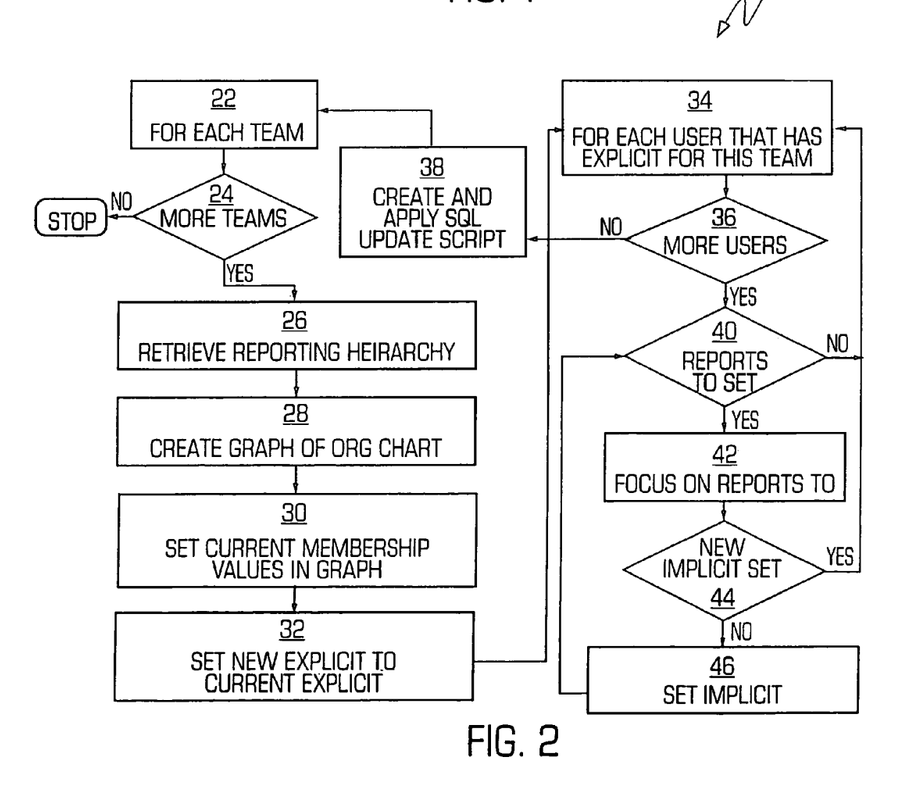
FIG. 2 is a diagram illustrating a method for rebuilding implicit team membership in accordance with the invention.

FIG. 2 is a diagram illustrating a method 20 for rebuilding implicit team membership in accordance with the invention. In a preferred embodiment of the invention, the method is implemented as one or more computer instructions contained in the security module 112 that are executed by the processor(s) that execute the system shown in FIG. 1. The methods shown in FIGS. 2-7 operate on the team membership table so that the underlying item does not need to be involved so that the methods can operate more quickly. Returning to FIG. 2, if the team list is sufficiently small, or if there are sufficient system resources available, then the implicit team memberships can be rebuilt from scratch in memory as shown in FIG. 2. This method iterates through all of the teams stored in the database 110 by applying the same logic to each team in steps 22 and 24. For each team, the reporting hierarchy of each team member is retrieved in step 26 and stored in a directed graph in memory in step 28. Each node in the directed graph represents a user and each line represents an organizational reporting relationship. In step 30, the current team membership values are read in for each user that has a membership and these values are stored in the nodes of the directed graph. The new explicit membership values are all set in step 32 based on the existing explicit membership values. At this point, there is a directed graph of every user in the system. Each reporting relationship has been captured as a directed link between nodes. The current membership information for the current team is captured in the nodes of the graph.

Figure 14:
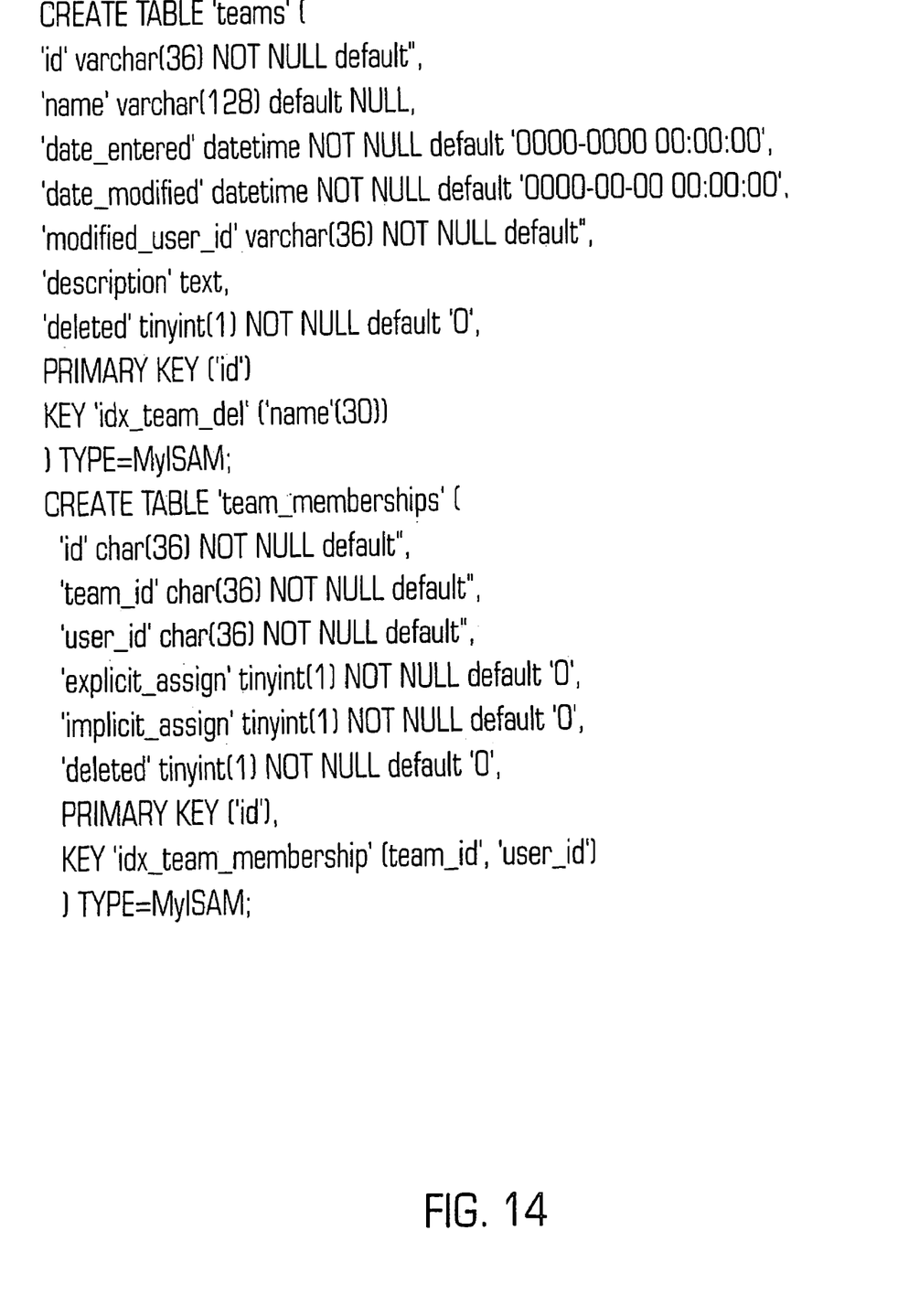
FIG. 14 is an example of the database code used to generate the team and team membership tables.

In step 34, the method looks at each explicit member/user of the current team. If there are not any other users then the method, in step 36, goes to step 38 to create and apply an SQL update script to update the team membership based on the implicit memberships determined by the method. If there are more users, then for each member in step 40, the method checks to see if that member reports to someone. If that member does report to someone, the method looks, in step 42, to see if the person they report to already has a new implicit membership set in step 44 by looking at the team membership tables (an example of which is shown in FIG. 14.) If the implicit relationship already exists (in the team membership table) since a previous user's run already set the value and traversed up the management tree, the method loops to step 34 to handle the next member with an explicit membership. The only other option is that there is a cycle in the reporting structure of the graph and this check will also prevent infinite loops in the process. If the implicit membership for the person that the user reports to is not set yet, then it is set now in step 46 and the current focus is set to that same user. Now, the method is analyzing the manager of the person that it started analyzing in this loop. The method will keep working its way up the management chain adding implicit relationships until it has found a user that was already processed or a user that is at the top of their organizational chart. Since this method loops through all users in the team, it will create a graph that shows the whole list of implicit memberships and also includes all of the historical values. This data is used to determine the minimum number of changes to make the SQL data correctly match the graph for this team. This is a very efficient method for recalculating the implicit memberships since it does everything in memory and then makes the SQL calls once for each team. After the SQL calls for the team are done, the method moves on to the next team in step 22. The method is completed when all of the implicit relationships of all of the teams are done.

Figure 3:
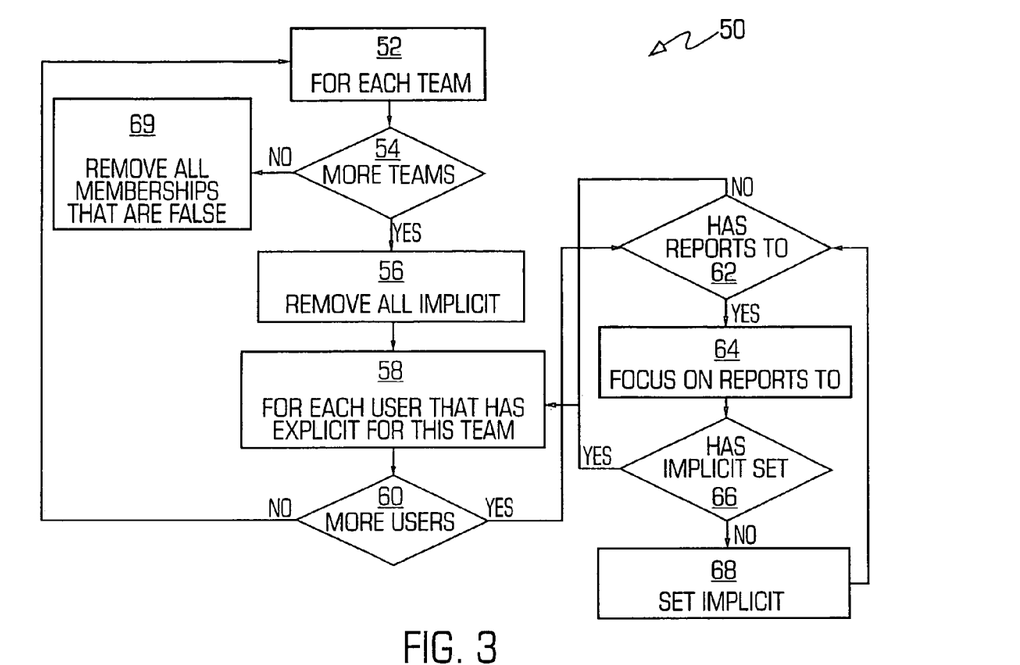
FIG. 3 is diagram illustrating an iterative method for rebuilding implicit relationships in accordance with the invention.

FIG. 3 is diagram illustrating an iterative method 50 for rebuilding implicit relationships in accordance with the invention. In a preferred embodiment of the invention, the method is implemented as one or more computer instructions contained in the security module 112 that are executed by the processor(s) that execute the system shown in FIG. 1. The method leverages the database and can be used in situations where server resources are highly constrained. Generally, the method rebuilds team memberships for each team in the system shown in FIG. 1. Thus in steps 52 and 54, for each team, it begins by removing all implicit memberships in step 56. Once it has removed the implicit memberships, it loops over all of the explicitly assigned members in steps 58 and 60. For each one, it looks to see if the members are listed as having someone that they report to in step 62. If they do have someone to which they report, the method focuses on the person to which the member reports in step 64. If the person to which the member reports already have implicit membership in this team then the method in step 66 moves on to the next implicit user and loops to step 62. If the person to which the member reports does not already have implicit membership in this team, then they are given an implicit membership in this team in step 68, and the method looks to see if that person has someone to whom he/she reports. The method continues to iterate until the method reaches someone that already has implicit membership in this team, or it gets to a person that does not have a person that they report to which indicates that all of the members of the team have been processed. The above method then repeats for each team in the system. Once it is complete, all memberships that don't have implicit or explicit membership in the teams are removed from the database in step 69. During the processing, existing membership values are left in the database to make it faster to update the membership tree. Since the method does not immediately delete people that only have implicit membership in the beginning of the method from the database, it does not have to remove the row and, most likely, put the row right back. This will save time on space allocation and management in the database.

Figure 4:
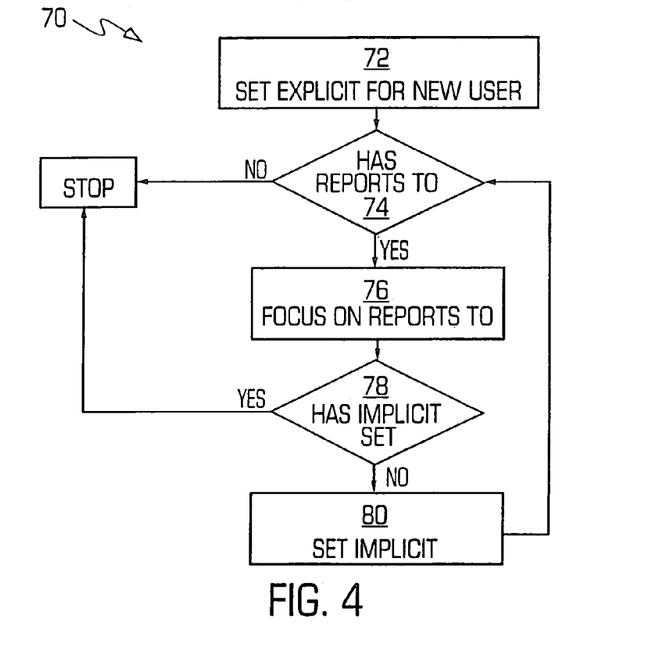
FIG. 4 is a diagram illustrating a method for iterative membership addition in accordance with the invention.

FIG. 4 is a diagram illustrating a method 70 for iterative membership addition in accordance with the invention. In a preferred embodiment of the invention, the method is implemented as one or more computer instructions contained in the security module 112 that are executed by the processor(s) that execute the system shown in FIG. 1. This mechanism is a subset of the process from the previous figures and this method runs when a user has a membership added to a team which means that people up the management hierarchy of that user need to be given implicit membership in the team. The method starts with the new user in step 72 when the explicit membership of the new user is created. Next, the method analyzes any persons to which the new member reports in steps 74 and 76. If there are not any persons to which the new member reports, or those persons already have implicit membership in step 78, then the method is done since the method has traversed the organizational hierarchy until the last person does not have any one who they report to or is at the top of the organizational chart. Otherwise, it sets implicit to true for those persons in step 80 and searches for a member to which the person reports in looping back to step 74 to repeat the process until it hits the top of the organizational chart or hits a user that already has implicit membership. The method can stop at the first person that has implicit membership because the algorithm that put that membership there should have been a similar method that would have propagated the implicit membership all the way up the hierarchy.

Figure 5:
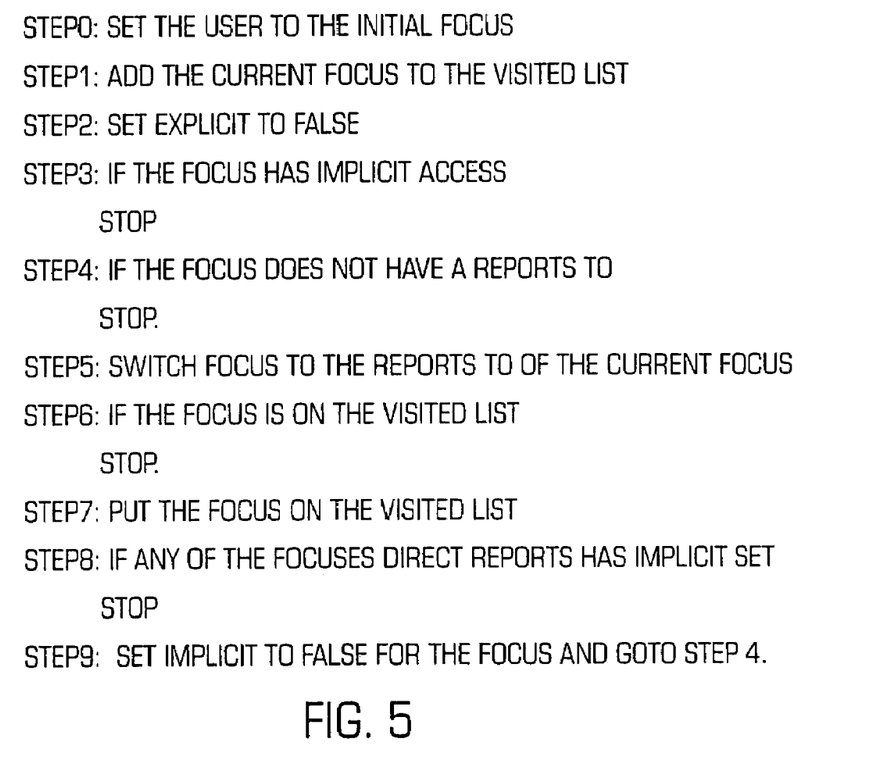
FIG. 5 is a diagram illustrating a method for iterative membership removal in accordance with the invention.

FIG. 5 is a diagram illustrating a method for iterative membership removal in accordance with the invention. In a preferred embodiment of the invention, the method is implemented as one or more computer instructions contained in the security module 112 that are executed by the processor(s) that execute the system shown in FIG. 1. This method is used to iteratively update the memberships when a user is removed from a team. First, it sets the initial member as the focus in step 0. In order to prevent an infinite loop, the method tracks all of the members that it has analyzed in an unordered collection or visited list. In step 1, the method adds the current member to the visited list. In step 2, the method sets explicit to false for the current member since that member is no longer part of the team. If the current member has implicit access to the same team or does not have a manager in step 3 and 4, the method stops. Otherwise, the method moves onto a person to which the removed member reports in step 5. If that person is on the visited list in step 6, the method stops. If the person to whom the removed member reports is not on the visited list, the person to whom the removed member reports is added to the visited list in step 7. The method then analyzes each person to whom the removed member reports to determine if that person reports to someone else (a next level report.) If any of next level reports have implicit or explicit access to the team in step 8, the method if completed. If the next level reports do not have implicit or explicit access to the team, then in step 9, the method sets implicit to false and loops back to step 4. This process continues until either a manager has access to the team from one of their other employees, the top of the hierarchy is reached, or the visited list detects a cycle.

Figure 6:
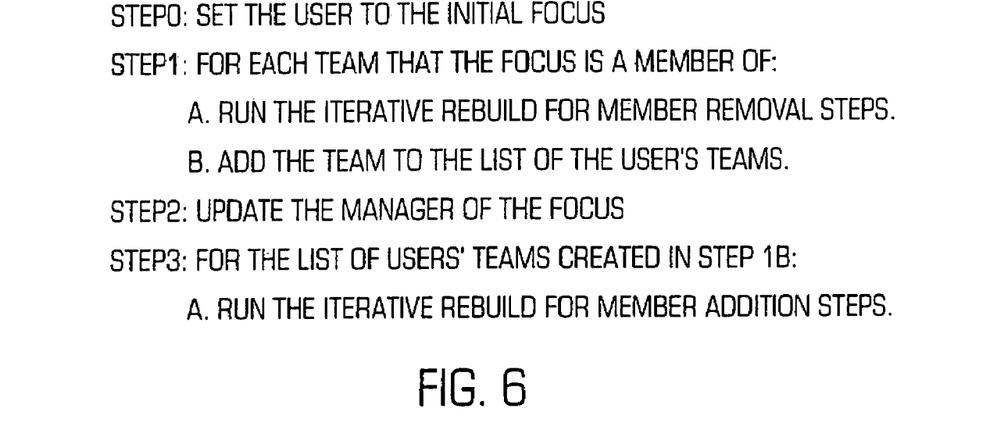
FIG. 6 is a diagram illustrating a method for iterative changing of a user's manager and updating team in accordance with the invention.

FIG. 6 is a diagram illustrating a method for iterative changing of a user's manager and updating team in accordance with the invention. In a preferred embodiment of the invention, the method is implemented as one or more computer instructions contained in the security module 112 that are executed by the processor(s) that execute the system shown in FIG. 1. This method is used when a person is moved to a different manager in the system. The overview of the method is that it removes all team memberships from the user in their current location, then it changes their current location, then it adds back all team memberships in the new location. In step 0, it starts by analyzing the member that is being reassigned (the "reassigned member"). In step 1, for each team that has the reassigned member as a member, the method runs the iterative rebuild for member removal process shown in FIG. 5 and then stores the team_id in a list of the reassigned member's teams. In step 2, the method analyzes any persons to which the reassigned member reports and, in step 3, builds the tree of memberships back. Thus, for each team that was removed earlier and placed on the list, run the iterative rebuild for member addition. This will put all explicit and implicit team memberships where they should be without the reassigned member.

Figure 7:
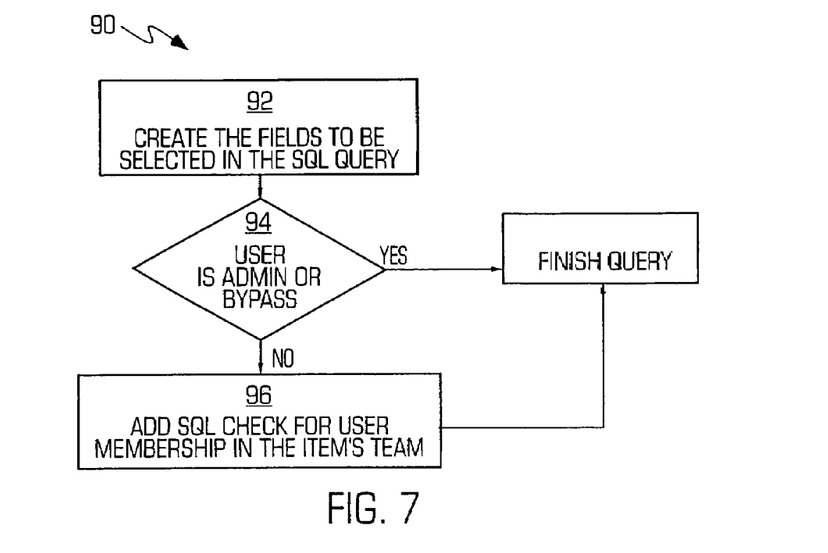
FIG. 7 is a diagram illustrating a method for checking security in accordance with the invention.

FIG. 7 is a diagram illustrating a method 90 for checking security in accordance with the invention. In a preferred embodiment of the invention, the method is implemented as one or more computer instructions contained in the security module 112 that are executed by the processor(s) that execute the system shown in FIG. 1. The security check is typically placed in the middle of the query for data from the system. First, the initial portion of the query is created in step 92. This is typically a select statement that details the fields that it would like to retrieve and the table(s) that they should be retrieved from. Then it checks, in step 94, to see if the user is an admin or if the module has a bypass flag set as admin users are allowed to see all records. If the user is an admin, the security check is skipped. A record may also contain a bypass flag that is set to true on subclasses of the main object that should not have security restrictions applied to them. These are typically objects that are used in the management and maintenance of the security of the system such as users, teams, and team_memberships. If the bypass flag is false or the requested is not an administrator, then an SQL query to enforce membership, that preferably consists of a right join on team_memberships that matches the user_id that is retrieving the data with the team_id from the data that is being retrieved, is added to the query in step 96. Then the remainder of the query is written. This new query will only return items to which the user should have access and enforce security based on the team membership.

Figure 8:
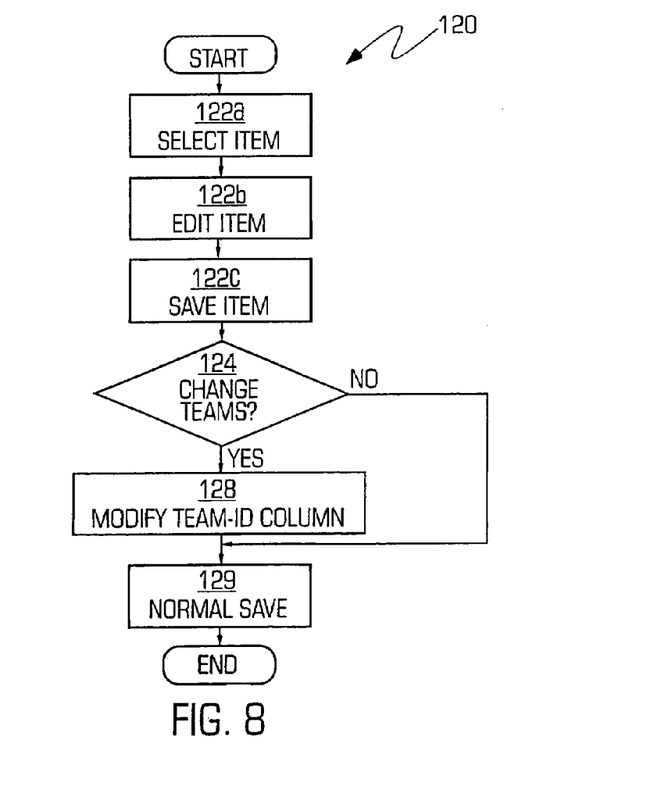
FIG. 8 illustrates a method for changing team assignment for a data item in accordance with the invention.
Figure 9:
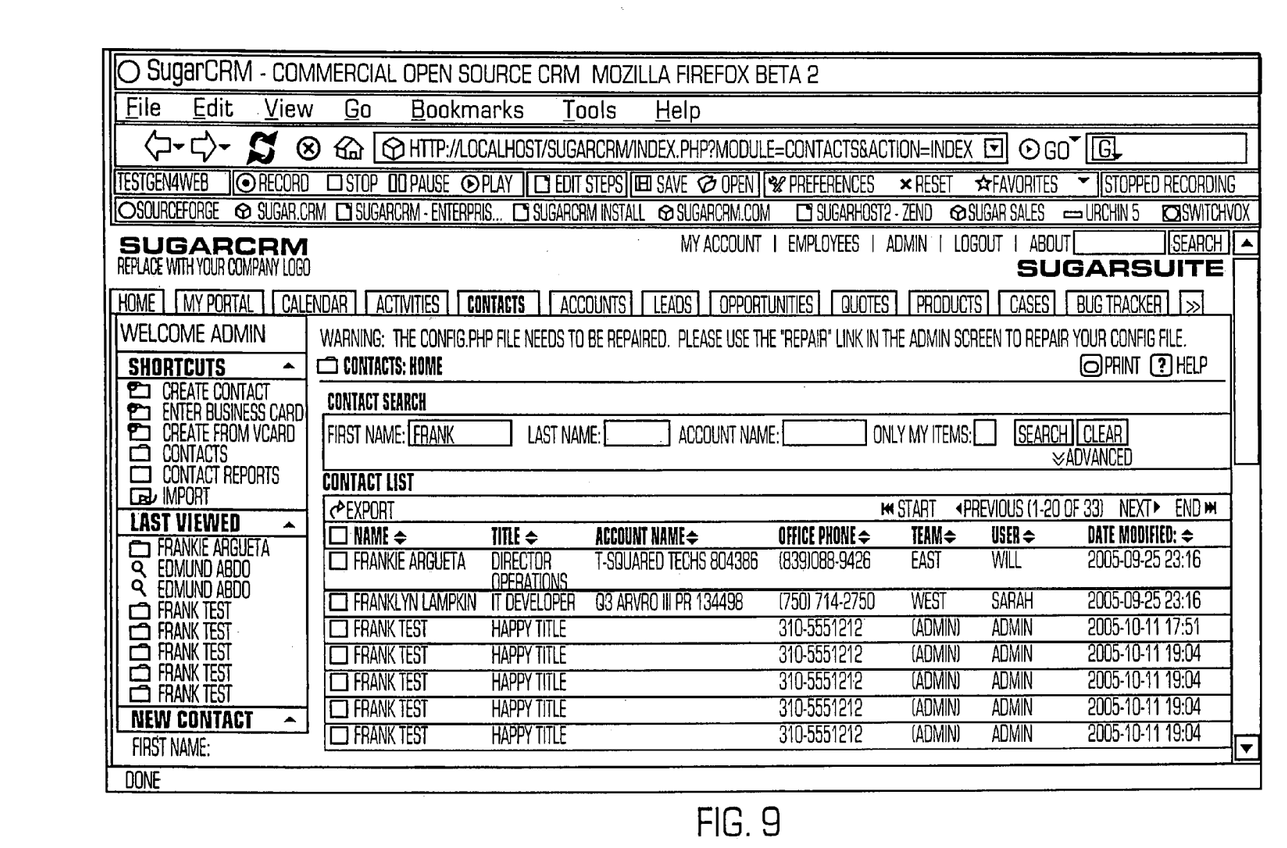
FIGS. 9-13 illustrate an example of the user interfaces for changing the team assignment of a data item.
Figure 10:
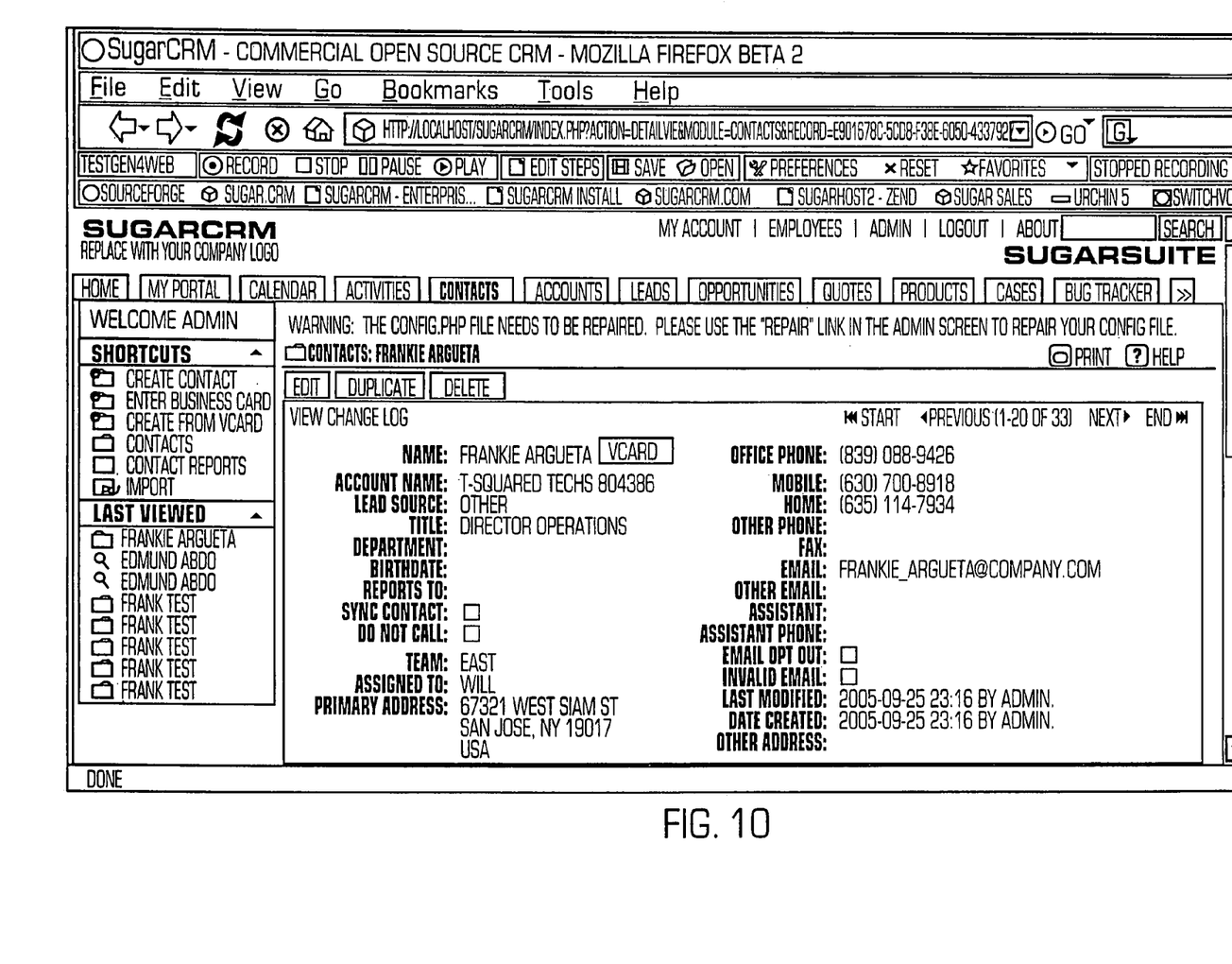
Figure 11:
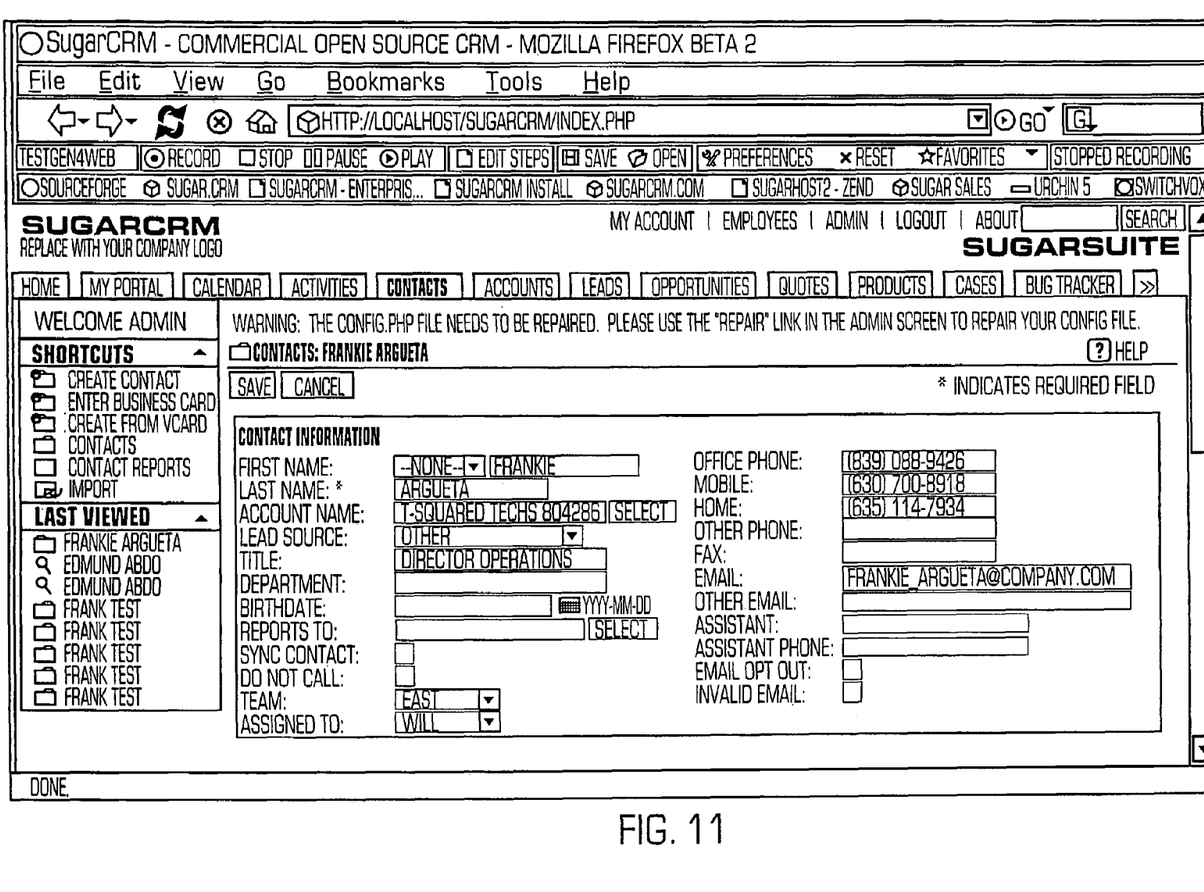
Figure 12:
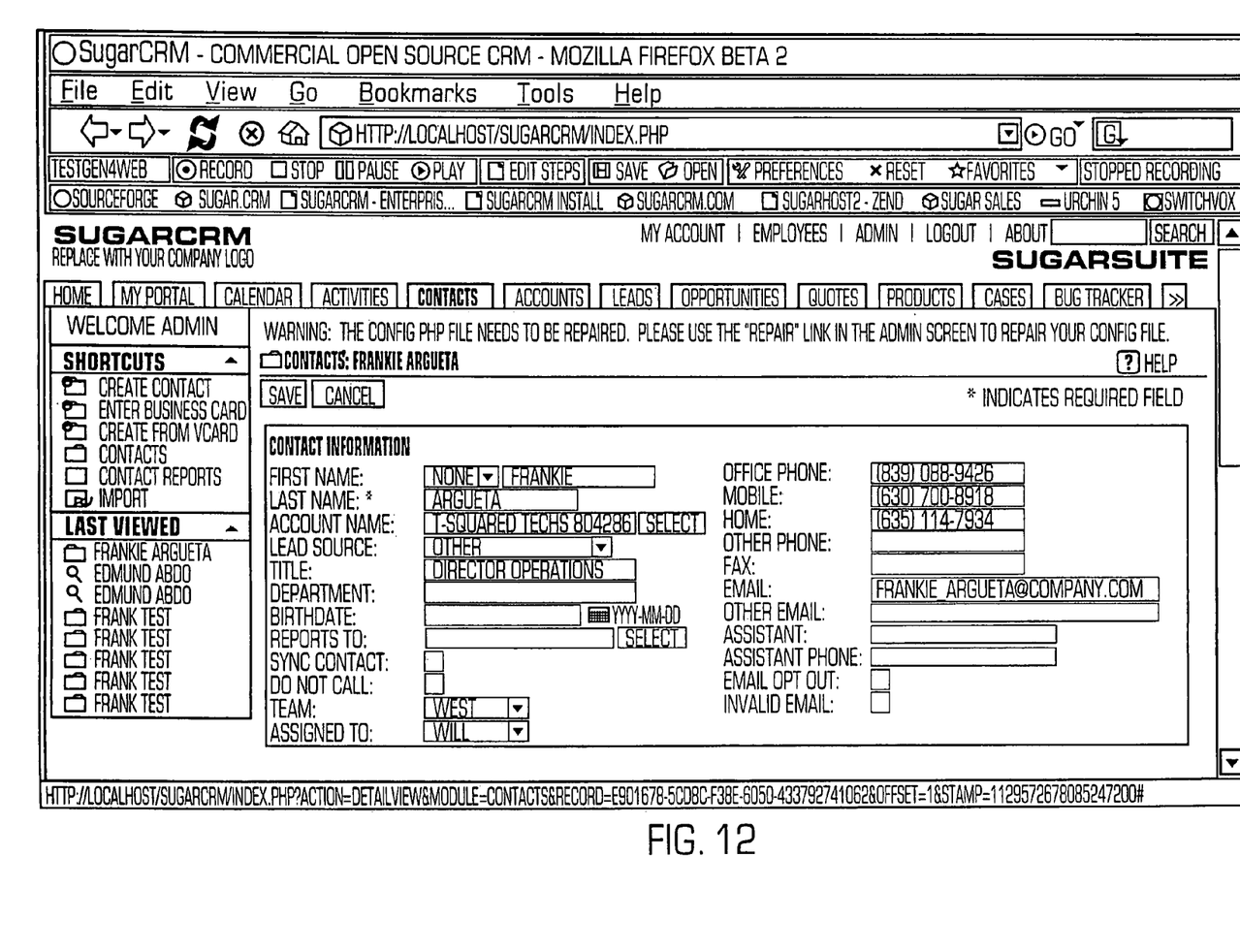
Figure 13:
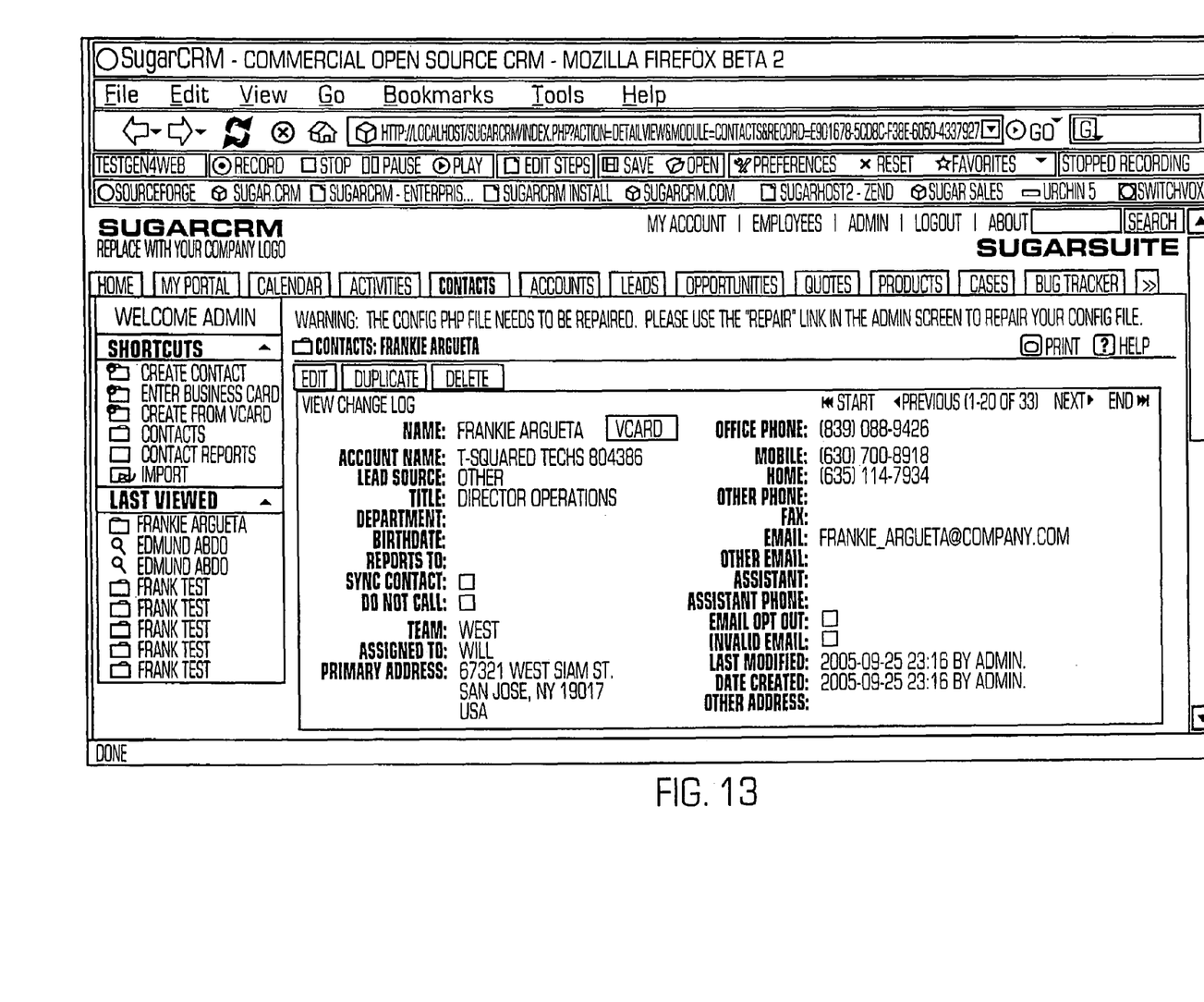

FIG. 8 illustrates a method 120 for changing the team assignment of a data item in accordance with the invention. In a preferred embodiment of the invention, the method is implemented as one or more computer instructions contained in the security module 112 that are executed by the processor(s) that execute the system shown in FIG. 1. In step 122*a*, the user selects and identifies a data item for which the team assignment is going to be changed. In steps 122*b* and 122*c*, the user may edit the data item and save the data item. FIGS. 9-11 show an example of the contacts list and an example of the user selecting a particular contact (an item) (Frankie Argueta). As shown in FIG. 10, the item shows that this exemplary data item is assigned to the "East" team. FIG. 11 shows the user interface that permits the user to change the team assignment assuming that the user has those rights. Thus, in step 124, the user changes the team assignment. In the example in FIG. 12, the team assignment has been changed to "West.". In step 128, to effect the team assignment change, the team_id column in the team ownership table is modified to reflect the new team that has control of the item shown in FIG. 12. FIG. 13 illustrates the user interface once the team assignment has been changed. In this manner, the team ownership of an item can be easily changed. In step 129, if there no team assignment change or once the team_id column is modified, the normal save logic is performed to save the data item.

FIG. 14 is an example of the database code used to generate the team and team membership tables. This is a listing of the SQL to create the team and team_membership tables. It is not intended to include and exhaustive list of possible indexes, but instead shows how the data structures can be stored and accessed in the production system. As shown, the team membership record for each item includes the team_id field, an explicit assignment field and an implicit field so that the team membership record contains the data necessary to make the team membership changes described above without having to modify the actual data record for the item.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. An apparatus for controlling access to an item, comprising:
   a computer system that executes a data access system that comprises a plurality of computer instructions to implement a data access system;
   the data access system having a data store containing a plurality of data items and a team membership record associated with a member, a team as signed to each data item and a security module that comprises a plurality of computer instructions to implement security of the plurality of data items; and
   wherein the security module further comprising computer instructions that modify the team membership record to assign a member to the team assigned to a particular data item wherein the team includes one or more of an explicit team member for a member explicitly assigned to the team for the particular data item and an implicit team member that identifies a second member that has an explicit team member who reports to the second member.

2. The apparatus of claim 1, wherein the security module further comprises computer instructions that automatically creates an implicit team membership for a member based on the members associated with the data access system and the reporting relationship of the members associated with the data access system.

3. The apparatus of claim 1, wherein the security module further comprises computer instructions that automatically adds implicit team memberships to the team membership record for the particular data item when a new explicit team membership is added to the team membership record based on the members associated with the data access system and the reporting relationship of the members associated with the data access system.

4. The apparatus of claim 1, wherein the security module further comprises computer instructions that automatically remove implicit team memberships from the team membership record for the particular data item when an explicit team membership is removed from the team membership record for the particular data item based on the members associated with the data access system and the reporting relationship of the members associated with the data access system.

5. The apparatus of claim 1, wherein the security module further comprises computer instructions that enforce the security of each data item based on the team membership record.

6. The apparatus of claim 5, wherein the computer instructions that enforce the security of each data item further comprises computer instructions that modify the SQL code of a query to the data store to enforce the security of each data item based on the team membership record.

7. The apparatus of claim 6, wherein the computer instructions that modify the SQL code of a query further comprises computer instructions that join on the team membership record that matches an identifier of a user that is retrieving the particular data record with a team_id from the particular data item to determine if the user can access the data item.

8. The apparatus of claim 6 wherein the query further comprises an SQL query.

9. The apparatus of claim 1 wherein each data item has a data record.

10. The apparatus of claim 9, wherein each data record is a data table.

11. A method for controlling access to a data item that is part of a data access system wherein the data item is stored in a data store, the method comprising:
    retrieving, when a particular data item is requested, a team membership record for a member and a team assigned to the particular data item, wherein the team includes one or more of an explicit team membership for a member explicitly assigned to the team that owns the particular data item and an implicit team membership that identifies a second member that has an explicit team member who reports to the second member; and
    modifying the team assignment for the particular data item to allow access to that particular data item to all members of the team.

12. The method of claim 11 further comprising automatically creating an implicit team membership for a member based on the members associated with the data access system and the reporting relationship of the members associated with the data access system.

13. The method of claim 11 further comprising automatically adding an implicit team membership for a member to the team assigned to the particular data item when a new explicit team membership is added to the team for the particular data item based on the members associated with the data access system and the reporting relationship of the members associated with the data access system.

14. The method of claim 11 further comprising automatically removing an implicit team membership for a member from the team assignment to the particular data item when an explicit team membership is removed from the team for the particular data item based on the members associated with the data access system and the reporting relationship of the members associated with the data access system.

15. The method of claim 11 further comprising enforcing the security of each data item based on the team membership record when the data item is requested.

16. The method of claim 15, wherein enforcing of each data item further comprises modifying the SQL code of a query to the data store to enforce the security of each data item based on the team membership record.

17. The method of claim 16, wherein modifying the SQL code of the query further comprises performing a join on the team membership record that matches an identifier of a user that is retrieving the particular data record with a team_id from the particular data item to determine if the user can access the data item.

18. An apparatus for controlling access to an item, comprising:
- a computer system that executes a data access system that comprises a plurality of computer instructions to implement a data access system;
- the data access system having a data store containing a plurality of data items and a team membership record associated with a member, a team assigned to each data item and a security module that comprises a plurality of computer instructions to implement security of the plurality of data items; and
- wherein the security module further comprises computer instructions that enforce the security of each data item based on the team membership record that further comprise computer instructions that insert a piece of code into a query to the data store to enforce the security of each data item based on the team membership record.

19. The apparatus of claim 18, wherein the computer instructions that insert the piece of code into the query further comprises computer instructions that join on the team membership record that matches an identifier of a user that is retrieving the particular data record with a team_id from the particular data item to determine if the user can access the data item.

20. The apparatus of claim 19, wherein the query further comprises an SQL query.

21. The apparatus of claim 20, wherein the piece of code further comprises SQL.

22. A method for controlling access to a data item that is part of a data access system wherein the data item is stored in a data store, the method comprising:
- retrieving, when a particular data item is requested, a team membership record for a member and a team assigned to the particular data item;
- enforcing the security of each data item based on the team membership record when the data item is requested; and
- wherein enforcing the security of each data item based on the team membership record further comprises inserting a piece of code into a query to the data store to enforce the security of each data item based on the team membership record.

23. The method of claim 22, wherein inserting the piece of code into the query further comprises performing a join on the team membership record that matches an identifier of a user that is retrieving the particular data record with a team_id from the particular data item to determine if the user can access the data item.

24. The method of claim 22, wherein the query further comprises an SQL query.

25. The method of claim 24, wherein the piece of code further comprises SQL.

26. An apparatus for controlling access to an item, comprising:
- a computer system that executes a data access system that comprises a plurality of computer instructions to implement a data access system;
- the data access system having a data store containing a plurality of data items and a team membership record associated with a member, a team assigned to each data item and a security module that comprises a plurality of computer instructions to implement security of the plurality of data items; and
- wherein the security module further comprises computer instructions that enforce the security of each data item based on the team membership record that further comprise computer instructions that modify the SQL code of a query to the data store to enforce the security of each data item based on the team membership record.

27. A method for controlling access to a data item that is part of a data access system wherein the data item is stored in a data store, the method comprising:
- retrieving, when a particular data item is requested, a team membership record for a member and a team assigned to the particular data item;
- enforcing the security of each data item based on the team membership record when the data item is requested; and
- wherein enforcing the security of each data item based on the team membership record further comprises modifying the SQL code of a query to the data store to enforce the security of each data item based on the team membership record.

* * * * *

UNITED STATES PATENT AND TRADEMARK OFFICE
CERTIFICATE OF CORRECTION

PATENT NO. : 7,395,552 B2 Page 1 of 1
APPLICATION NO. : 11/255674
DATED : July 1, 2008
INVENTOR(S) : Jacob Taylor, Clinton Oram and John Roberts It is certified that error appears in the above-identified patent and that said Letters Patent is hereby corrected as shown below:

Title Page
In section (75) Inventors: "Johri Roberts" should read --John Roberts--

Signed and Sealed this

Second Day of September, 2008

JON W. DUDAS
*Director of the United States Patent and Trademark Office*